United States Patent Office 3,364,279
Patented Jan. 16, 1968

3,364,279
OLEFIN POLYMERIZATION USING GROUP VIII METAL AND ZINC FLUORIDE OR BORIA ON ACTIVATED ALUMINA AS CATALYST
Stephen M. Kovach, Highland, Ind., assignor to Sinclair Research, Inc., Wilmington, Del., a corporation of Delaware
No Drawing. Continuation of application Ser. No. 245,390, Dec. 18, 1962. This application June 16, 1966, Ser. No. 558,146
11 Claims. (Cl. 260—683.15)

ABSTRACT OF THE DISCLOSURE

Aliphatic monoolefin hydrocarbons of 3 to about 12 carbon atoms, e.g., propylene, are polymerized in liquid phase to multiple unit polymers, e.g., pentamers, using a catalyst consisting essentially of a Group VIII metal, zinc fluoride or boria, and an activated alumina support.

This application is a continuation of application Ser. No. 245,390, filed Dec. 18, 1962, now abandoned.

This invention relates to a process for the polymerization of olefins to polymers whose molecular weights correspond to multiple units of the olefin and in particular, the olefin tetramer, pentamer and hexamer. Specifically, the present invention is directed to the selective polymerization of aliphatic monoolefin hydrocarbons containing 3 to 12 carbon atoms, and particularly to the polymerization of olefins containing 3 or 4 carbon atoms.

Olefins can be polymerized over known polymerization catalysts such as phosphoric acid to yield polymers of varying molecular weight. For instance, in propylene polymerization the propylene dimer and trimer fractions are utilized in motor gasoline and propylene tetramer and tridecene as alkylating agents in the manufacture of alkylaryl detergents. The tetramer and tridecene are actually composed of olefin polymers with varying molecular weights which give an average carbon number of $C_{12}$ and $C_{13}$, respectively. Processing propylene under typical commercial conditions (vapor-phase) over one of the common commercial catalysts, e.g. a calcined composite of phosphoric acid on kieselguhr, liquid phosphoric acid film on quartz, liquid acids such as phosphoric, sulfuric, etc.; however, yields a non-descript product containing olefin polymers in the molecular weight range of $C_7$ through $C_{20}$ and contains substantial amounts of intermediate molecular weight olefin polymers.

The trend in alkylaryl detergent manufacture is currently towards the use of higher molecular weight olefins such as the tetramers and hexamers. Unfortunately, the yield of high molecular weight olefins is low over commercial catalysts such as phosphoric acid on kieselguhr and necessitates a recycle operation. In propylene polymerization one does not obtain the selective polymerization of propylene to the pentamer and hexamer. Many other catalyst systems investigated in the vapor-phase polymerization of propylene afford no better product distribution and yield than obtained from use of the phosphoric acid on kieselguhr catalyst.

A process has now been discovered whereby $C_3$ to $C_{12}$ aliphatic monoolefin hydrocarbons, particularly the $C_3$–$C_4$ olefins, can be polymerized to high selective yields of the dimer, trimer, tetramer, pentamer, hexamer and high homologues with high conversions of olefin. Moreover, the liquid olefin products of this process correspond to an unusually large extent in molecular weights to multiple units of the olefin, that is, there is a substantial reduction in intermediate molecular weight olefin polymers, and preferably the product contains little if any intermediate molecular weight olefin polymers.

In accordance with the process of the present invention the olefin is polymerized over a catalyst containing an active hydrogenation-dehydrogenation metal selected from Group VIII of the Periodic Table on a fluorine-alumina or boria-alumina catalyst while employing a particular set of operating conditions. To obtain the desired results, it is important that the conditions of temperature and pressure employed in the process be such that the olefin remains essentially in the liquid phase. This necessitates maintaining processing temperatures below the critical temperature of the olefin, for instance in the polymerization of propylene a temperature below about 198° F., and operating pressures above the vapor pressure of the olefin at the processing temperature under essentially anhydrous conditions. In the polymerization convenient reaction temperatures are below about 200° F., for instance about 0 to 197° F., for propylene, preferably about 70 to 180° F. and the pressure often ranges from about 0 to 2000 p.s.i.g., preferably about 200 to 1000 p.s.i.g. Space velocities in the range of about 0.1 to 20 LHSV (liquid hourly space velocity) have been found suitable but a space velocity of about 0.1 to 10 LHSV is preferred.

Due to the exothermicity of the polymerization reaction and the narrow temperature operating range, it is preferred to employ internal means as heat sinks. This can be accomplished for instance by employing inert hydrocarbon and catalyst diluents. The catalyst diluents are solid and the hydrocarbon diluents are liquid at the reaction conditions. The hydrocarbon diluent can be any hydrocarbon, unable to undergo polymerization, condensation, alkylation, or other reaction under the process conditions. This would encompass paraffins, naphthenes, etc. The non-aromatics are preferred and an especially preferred inert hydrocarbon diluent is propane. The inert hydrocarbon diluent reduces the concentration of olefin in the liquid phase and at the catalyst surface and often acts as a heat sink. If aromatics are used as a diluent, benzene, toluene, xylene and other mono- and (di-substituted) aromatics are undesirable since they may undergo alkylation with the olefin under the mild reaction conditions for selective polymerization. The aromatic solvent should be non-alkylatable under the conditions utilized, i.e. they should be highly substituted as for instance tetra or higher substituted benzenes. The choice of solvent will depend on factors such as the olefin feed, etc. which tend to maximize polymerization and minimize alkylation. Suitable inert catalyst diluents are any materials not supporting the polymerization, e.g. tabular alumina, nor which would destroy the polymerization activity of the catalyst. The amount of liquid diluent may be present in the range of about 0 to about 10 or more, preferably about 0.5 to 2, volumes of diluent to about 1 volume of the olefin. The solid diluent may be present in a volume ratio of about 0 to about 10, preferably about 1 to 3, volumes of the solid diluent to about 1 volume of the catalyst. In addition, external sources of cooling may be utilized such as circulating cold water, cold feed, air, etc.

The catalyst of the present invention is an alumina base catalyst containing fluorine or boria in combination with an active hydrogenation-dehydrogenation metal component selected from Group VIII of the Periodic Table. This catalyst affords olefin polymerization while facilitating carbon double bond isomerization which yields a better polymer for aromatic alkylation, low depolymerization and catalyst regeneration by removal of the adsorbed heavy polymer through hydrogenation to a paraffin which is easily desorbed. The incorporation of the hydrogenation-dehydrogenation component on a boria or fluorine on alumina catalyst does not deleteriously affect selectivity, conversion, or product distribution as compared to boria or fluorine on alumina as shown in the data presented hereinafter.

The boria or fluorine promoting component is present on the alumina support in catalytically effective amounts. Generally this amount will fall within the range of about 2 to 20% by weight, preferably about 3 to 15% by weight. The fluorine can be present on the catalyst in the form of the ion per se or in combination such as a metal fluoride, e.g. zinc or aluminum fluoride, fluosilicic acid, or fluoborate. The active hydrogenation-dehydrogenation metal component is generally present in amounts from about 0.1 to 20% by weight. The iron group metals of Group VIII, e.g. iron, cobalt and nickel, are preferably present in amounts of about 0.5 to 10% by weight and the platinum group metals of Group VIII, e.g. palladium, platinum, etc., are preferably present in amounts of about 0.3 to 3% by weight.

The catalyst support of the present invention is an activated or a gamma family alumina, e.g. gamma, eta, etc., such as those derived by calcination of amorphous hydrous alumina, alumina monohydrate, alumina trihydrate, or their mixtures. The catalyst base most advantageous is derived from a mixture predominating, for instance, about 65 to 95 weight percent, in one or more of the alumina trihydrates, i.e. bayerite I, randomite (nordstrandite), or gibbsite, and also having about 5 to 35 weight percent of alumina monohydrate (boehmite), amorphous hydrous alumina or their mixture. The alumina support can contain small amounts of other materials, e.g. solid oxides such as silica, magnesia, activated clays, titania, zirconia, etc. or their mixtures.

The metal components can be added to the alumina catalytic support by known procedures, for instance impregnation using a water-soluble inorganic compound of the catalytic component or by precipitation or co-precipitation. The support can be impregnated with the components simultaneously or singly in any order. In the case of fluorine on alumina, the fluorine is commonly added through the use of a water-soluble fluoride compound and can be added to the catalyst base in any stage of its preparation, for instance before or after it has been formed by tabletting or extrusion and calcined. After fluorine addition, the catalyst can be calcined although ammonium fluoride is generally preferred other water-soluble fluoride compounds, for example, ammonium fluosilicate, ammonium fluoborate, hydrofluosilicic acid, hydrofluoric acid and the like can be employed. In the case of boria-alumina, the boria can be added to the catalyst base in any stage of its preparation; however, it is frequently added to the catalyst after it has been formed by tabletting or extrusion and calcined. After the boria component addition, the catalyst can be calcined. A suitable water soluble boria compound is boric acid.

The active hydrogenation-dehydrogenation components can be added to the boria-alumina or fluorine on alumina catalyst as water soluble compounds in the form of the nitrate, halide, sulfate, etc., which upon calcination leave no residue but the metal or metal oxide. When employing the impregnation procedure the resulting impregnated product is dried generally at a temperature within the range of about 170° F. to 400° F. for at least 6 hours and up to 24 hours or more with a stream of air circulated to carry off the water vapor. The dried catalyst mixture then may be formed by a tabletting or extruding operation. The dried pellets are suitable for subjection to high temperature treatment or calcination at a temperature between about 500° F. and about 1500° F., usually between about 700° F. and 1000° F., for instance, for a period of between about 2 and about 36 hours. Alternatively, the active hydrogenation-dehydrogenation components can be added to the alumina support either prior to the addition of the acidic promoter or along with the acidic promoter component.

An important property of propylene polymers is defined as R factor, i.e. the ratio of the trans internal olefin to isopropenyl olefin, and relates to the depolymerization susceptibility of these polymers during alkylation. A satisfactory polymer, in regard to yielding a small amount of lower molecular fragments through depolymerization, has an R factor of unity or greater. For instance, in the liquid phase polymerization of propylene using fluorine on alumina and boria-alumina catalysts the tetramer and pentamer fractions in the polymerization product have values for the R factor of less than unity indicating a predominance of the isopropenyl structure which can undergo depolymerization to yield lower molecular weight fragments. This data is presented in Runs 1, 2, and 3 in Table I.

TABLE I
[Conditions: 80-90° F., 800 p.s.i.g., 1 LHSV, $C_3=$]

| | Run No. | | |
|---|---|---|---|
| | 1 | 2 | 3 |
| Catalyst | 12% $ZnF_2$/$Al_2O_3$ | 10% $B_2O_3$/$Al_2O_3$ | $Al_2O_3$+3% F |
| Tab. $Al_2O_3$/Cat. v./v | 1/1 | 1/1 | 1/1 |
| $C_3=$ Conversion, Wt. Percent | 65 | 81 | 78 |
| Wt. Percent Product: | | | |
| $C_6=$ | T | 4 | T |
| $C_9=$ | 20 | 35 | 26 |
| $C_{12}=$ | 27 | 31 | 26 |
| $C_{15}=$ | 19 | 20 | 15 |
| $C_{18}=+$ | 34 | 10 | 33 |
| R Factor: | | | |
| $C_{12}=$ | .68 | .75 | .64 |
| $C_{15}=$ | .74 | .68 | .66 |
| H'C Adsorbed on Catalyst, Wt. Percent Cat | 22 | 30 | 30 |

The R factor may be increased in value by employing higher temperatures, but at higher temperatures the polymerization will take place in the vapor phase which leads to disproportionation and the loss of polymerization selectivity. However, by the process of the present invention the R factor may be increased to near or above unity while maintaining a liquid-phase operation for product selectivity by incorporating catalytic amounts of an active hydrogenation-dehydrogenation metal component selected from Group VIII of the Periodic Table on a fluoride-alumina or boria-alumina catalyst.

To illustrate the process of the present invention, Example I is included.

*Example I*

Propylene polymerizations were conducted in the liquid phase under the conditions shown in Table II, below.

TABLE II

[Conditions: 75° F., 800 p.s.i.g., 1 LHSV. Feed: Propylene]

| Catalyst | Run No. | | | | |
|---|---|---|---|---|---|
| | 4 | 5 | 6 | 7 | 8 |
| Catalyst | 5% NiO, 10% $B_2O_3$ $Al_2O_3$ | 0.6% Pt, 10% $B_2O_3$ $Al_2O_3$ | 10% $Cr_2O_3$ 10% $B_2O_3$ $Al_2O_3$ | 5% NiO, 12% $ZnF_2$ $Al_2O_3$ | 0.6% Pt, 0.75% F $Al_2O_3$ |
| Tab. $Al_2O_3$/Cat. v./v | 1/1 | 1/2 | 1/2 | 1/2 | 0/1 |
| $C_3$=conversion, Wt. percent | 68 | 84 | 50 | 78 | 25 |
| Wt. Percent Product: | | | | | |
| $C_6$= | T | 3 | 7 | 12 | 7 |
| $C_9$= | 27 | 27 | 57 | 30 | 32 |
| $C_{12}$= | 32 | 27 | 20 | 24 | 19 |
| $C_{15}$= | 15 | 18 | 9 | 14 | 17 |
| $C_{18}$=+ | 26 | 15 | 5 | 19 | 16 |
| R Factor: | | | | | |
| $C_{12}$= | 1.24 | 1.13 | 0.41 | .99 | .70 |
| $C_{15}$= | 1.02 | 0.84 | 0.19 | 1.05 | .61 |
| H'C Adsorbed on Catalyst, Wt. Percent Cat | 22 | 30 | 30 | 14 | 5 |

In Table I, boria-alumina and fluorine containing catalysts (Runs 1, 2 and 3) gave dodecene and pentadecene fractions having R factors of .64 to .75. Incorporating nickel into the catalyst nearly doubled the R factor of the dodecene and pentadecene fractions (Runs 4 and 7). Incorporating platinum into boria-alumina greatly increased the R factor of the decene and pentadecene fractions (Run 5). The low conversion of propylene in Run 8 is attributed to the low concentration of fluorine and it is expected that by increasing the fluorine content in the catalyst the propylene conversion would be higher. In Run 6, incorporating chromia into a boria-alumina catalyst yielded a lower R factor and gave lower conversions than that obtained with boria-alumina. It is believed that the chromia formed a chromia-boria complex with the result that the amount of boria available for selective polymerization was decreased.

The catalysts of the present invention possess unique fouling and regenerating features. By operating at low temperatures these catalysts become deactivated not by carbon laydown on catalyst but by the plugging of the catalyst pores by heavy polymeric material. Polymerization activity can be restored, however, by washing the catalyst with a suitable paraffin or aromatic hydrocarbon solvent as, for instance, n-pentane or benzene. If solvent washing fails, reactivation can be brought about by heat-treating the catalyst to 400 to 700° F. and purging with an inert gas such as nitrogen. This high temperature purge drives the heavy polymeric material out of the pores of the catalyst depositing only a small amount of carbon on the catalyst without loss in polymerization activity.

Also, the polymerization activity of the catalyst may be restored by hydrogenation which hydrogenates the adsorbed polymer to the corresponding paraffin which is then easily desorbed. The hydrogenating can be carried out under the same conditions as employed in the polymerization or under hydrogenation conditions well known to those skilled in the art. It is preferred, however, that hydrogenation temperatures be generally kept below about 200° F. when propylene is polymerized. Table III gives the results on removing adsorbed polymer from a catalyst by hydrogenation.

TABLE III

[75° F., 800 p.s.i.g., 1 LHSV, $C_3$=]

| | Run No. | | |
|---|---|---|---|
| | 9 | 10 | 2 |
| Catalyst | 0.6% Pt, 10% $B_2O_3$ $Al_2O_3$ | 10% $B_2O_3$ $Al_2O_3$ | 10% $B_2O_3$ $Al_2O_3$ |
| Post Treatment | $H_2$ | [1] $C_3$ | None |
| Olefin Conversion, Wt. Percent | 80 | 77 | 81 |
| H'C Adsorbed on Catalyst, Wt. Percent Cat | 3 | 15 | 30 |

[1] Wash.

In Run 2 the catalyst had adsorbed 30 weight percent polymer which was not removed by an inert gas purge. In Run 10 by employing propane as an inert hydrocarbon diluent and utilizing an inert gas purge the polymer adsorbed on the catalyst was reduced to 15 weight percent. However, in Run 9, where hydrogen was substituted for the inert gas, the adsorbed polymer was hydrogenated to the corresponding paraffin and easily desorbed. The resulting catalyst had only 3 weight percent hydrocarbon adsorbed on the catalyst surface.

The processing feedstocks should be in an anhydrous state since the catalyst system readily adsorbs water which leads to rapid catalyst deactivation and subsequent loss in polymerization activity.

It is claimed:

1. A process for the selective polymerization of $C_3$ to $C_{12}$ aliphatic monoolefin hydrocarbons to polymers whose molecular weights correspond to multiple units of said olefin which consists essentially of polymerizing said olefin in the liquid phase in contact with a catalyst consisting essentially of an activated alumina support, about 2 to 20% by weight of a member selected from the group consisting of zinc fluoride and boria and about 0.1 to 20% by weight of a metal or oxide of a metal of Group VIII of the Periodic Table.

2. A process for the selective polymerization of $C_3$ to $C_{12}$ aliphatic monoolefin hydrocarbons to polymers whose molecular weights correspond to multiple units of said olefin which consists essentially of polymerizing said olefin in the liquid phase in contact with a catalyst consisting essentially of an activated alumina support, about 2 to 20% by weight of a member selected from the group consisting of zinc fluoride and boria, and about 0.1 to 20% by weight of nickel or an oxide of nickel.

3. A process for the selective polymerization of $C_3$ to $C_4$ aliphatic monoolefin hydrocarbons to polymers whose molecular weights correspond to multiple units of said olefin which consists essentially of polymerizing said olefin in the liquid phase at a temperature of about 70 to 180° F. and at a pressure of about 200 to 1000 p.s.i.g., in contact with a catalyst consisting essentially of an activated alumina support, about 2 to 20% by weight of a member selected from the group consisting of zinc fluoride and boria and about 0.1 to 20% by weight of a metal or oxide of a metal selected from the group consisting of platinum and nickel.

4. The process of claim 3 wherein the olefin is propylene.

5. The process of claim 3 wherein the catalyst consists essentially of about 3 to 15% by weight of zinc fluoride and about 0.5 to 10% by weight of nickel oxide on an activated alumina support.

6. The process of claim 3 wherein the catalyst consists essentially of about 3 to 15% by weight of boria and about 0.5 to 10% by weight of nickel oxide on an activated alumina support.

7. The process of claim 3 wherein the catalyst consists essentially of about 3 to 15% by weight of boria and about 0.3 to 3% by weight of platinum on an activated alumina support.

8. A process for the selective polymerization of $C_3$ to $C_{12}$ aliphatic monoolefin hydrocarbons to polymers whose molecular weights correspond to multiple units of said olefin which consists essentially of polymerizing said olefin in the liquid phase in contact with a catalyst consisting essentially of an activated alumina support, about 2 to 20% by weight of boria and about 0.1 to 20% by weight of a metal or oxide of a metal of Group VIII of the Periodic Table.

9. The process of claim 8 wherein the temperature is about 70 to 180° F., the pressure is about 200 to 1000 p.s.i.g. and the olefin is propylene.

10. The process of claim 8 wherein the catalyst consists essentially of about 3 to 15% by weight of boria and about 0.5 to 10% by weight of nickel oxide on an activated alumina support.

11. The process of claim 8 wherein the catalyst consists essentially of about 3 to 15% by weight of boria and about 0.3 to 3% by weight of platinum on an activated alumina support.

References Cited

UNITED STATES PATENTS

| | | | |
|---|---|---|---|
| 1,988,112 | 1/1935 | Egloff | 260—683.15 |
| 2,131,806 | 10/1938 | Ipatieff et al. | 260—683.9 |
| 2,381,198 | 8/1945 | Anderson et al. | 260—683.15 |
| 2,381,481 | 8/1945 | Bailey et al. | 260—683.15 |
| 2,406,869 | 9/1946 | Upham | 260—683.15 |
| 2,830,106 | 4/1958 | Good et al. | 260—683.15 |
| 3,116,345 | 12/1963 | Slaymaker | 260—683.15 |
| 3,249,646 | 5/1966 | Kovach | 260—677 |
| 3,257,473 | 6/1966 | Kovach | 260—683.15 X |
| 3,296,331 | 1/1967 | Kovach | 260—683.15 |

PAUL M. COUGHLAN, JR., *Primary Examiner.*